US012641511B2

(12) United States Patent
     Zhang

(10) Patent No.:  US 12,641,511 B2
(45) Date of Patent:     May 26, 2026

(54) SWITCHING CONTROL METHOD AND APPARATUS FOR SERVICE SERVER, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Zhuoyun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 734 days.

(21) Appl. No.: 17/989,456

(22) Filed: Nov. 17, 2022

(65) Prior Publication Data

US 2023/0078344 A1     Mar. 16, 2023

Related U.S. Application Data

(63) Continuation of application No. PCT/CN2022/073774, filed on Jan. 25, 2022.

(30) Foreign Application Priority Data

Feb. 20, 2021     (CN) .......................... 202110194980.3

(51) Int. Cl.
     *H04W 40/02*        (2009.01)
     *H04W 36/12*        (2009.01)
(52) U.S. Cl.
     CPC ........... *H04W 40/02* (2013.01); *H04W 36/12* (2013.01)
(58) Field of Classification Search
     CPC . H04W 40/02; H04W 36/12; H04W 28/0226; H04W 28/084; H04W 40/20;
     (Continued)

(56) References Cited

U.S. PATENT DOCUMENTS

2020/0329403 A1     10/2020  Yuan et al.
2021/0051762 A1*     2/2021  Young ..................... H04W 8/08
2021/0250838 A1*     8/2021  Lu .......................... H04W 76/11

FOREIGN PATENT DOCUMENTS

CN          108934007 A     12/2018
CN          109981316 A      7/2019
                (Continued)

OTHER PUBLICATIONS

The World Intellectual Property Organization (WIPO) International Search Report for PCT/CN2022/073774 Apr. 15, 2022 7 Pages (including translation).

(Continued)

*Primary Examiner* — Derrick W Ferris
*Assistant Examiner* — Jesse P. Samluk
(74) *Attorney, Agent, or Firm* — Anova Law Group, PLLC

(57) ABSTRACT

A switching control method includes: receiving a trigger message for triggering a service scheduling server to reschedule a service server for user equipment; rescheduling, in response to the trigger message, the service server for the user equipment; transmitting an impact routing request to a core network accessed by the user equipment, the impact routing request being used for triggering the core network to change a user plane path of the user equipment; and transmitting an Internet Protocol (IP) address of the rescheduled service server to the user equipment, to trigger the user equipment to switch a currently accessed service server to the rescheduled service server.

20 Claims, 9 Drawing Sheets

(58) Field of Classification Search
CPC ... H04L 45/0377; H04L 45/85; H04L 47/748;
H04L 47/76; H04L 47/765; H04L 47/767;
H04L 47/781; H04L 67/02
See application file for complete search history.

(56) References Cited

FOREIGN PATENT DOCUMENTS

| | | | |
|---|---|---|---|
| CN | 110995826 | A | 4/2020 |
| CN | 111083750 | A | 4/2020 |
| CN | 111586114 | A | 8/2020 |
| CN | 112969208 | A | 6/2021 |
| CN | 112969209 | A | 6/2021 |
| WO | 2021016631 | A2 | 1/2021 |

OTHER PUBLICATIONS

The European Patent Office (EPO) The Extended European Search
Report for 22755498.7 Mar. 22, 2024 11 Pages.
"3rd Generation Partnership Project; Technical Specification Group
Services and System Aspects; Study on enhancement of support for
Edge Computing in 5G Core network (5GC) (Release 17)", 3GPP
Draft; 23748-040, 3rd Generation Partnership Project (3GPP), Mobile
Competence Centre; 650, Route Des Lucioles; F-06921 Sophia-
Antipolis Cedexx; France, Jun. 23, 2020.

* cited by examiner

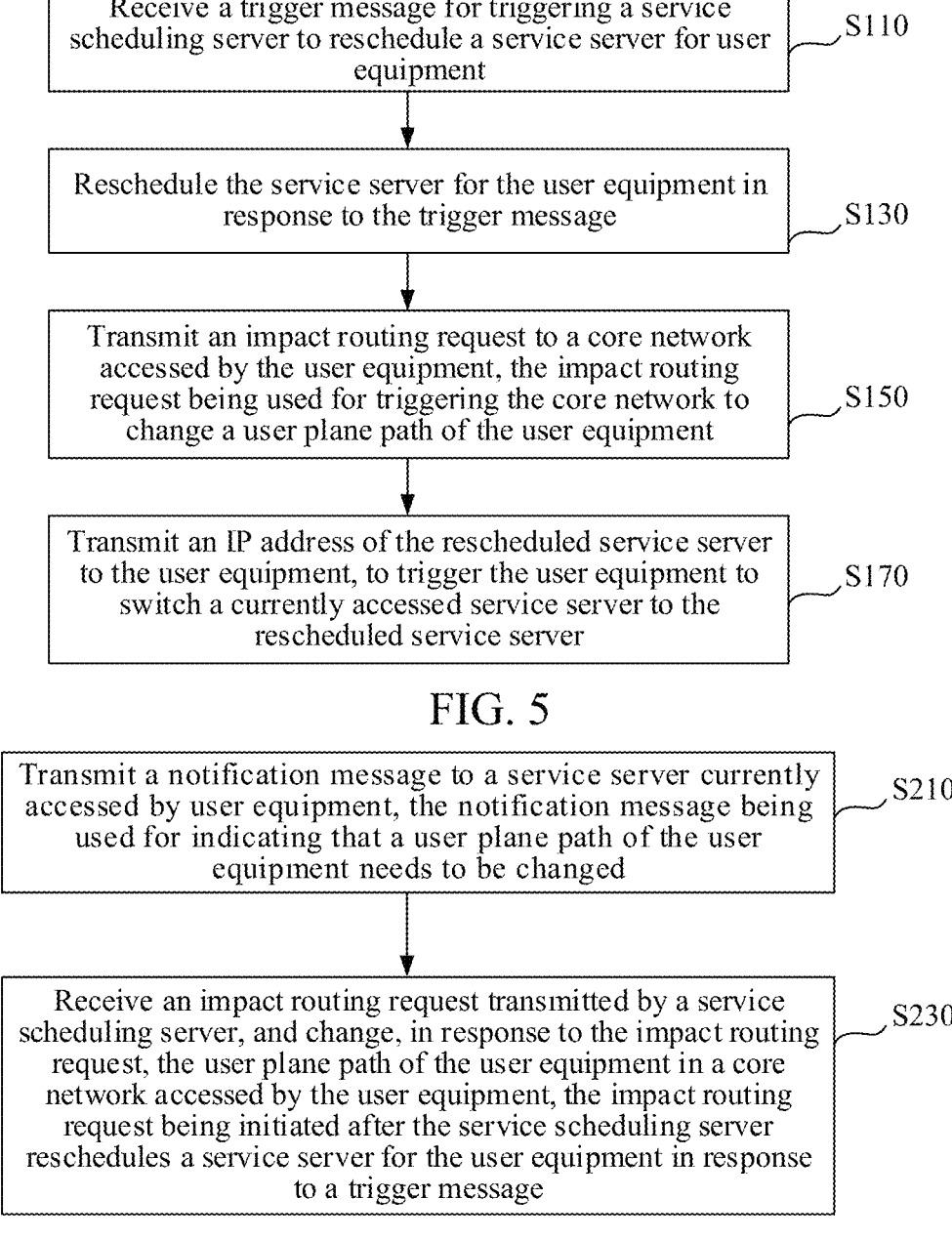

Receive a trigger message for triggering a service
scheduling server to reschedule a service server for user
equipment ─── S110

Reschedule the service server for the user equipment in
response to the trigger message ─── S130

Transmit an impact routing request to a core network
accessed by the user equipment, the impact routing
request being used for triggering the core network to
change a user plane path of the user equipment ─── S150

Transmit an IP address of the rescheduled service server
to the user equipment, to trigger the user equipment to
switch a currently accessed service server to the
rescheduled service server ─── S170

FIG. 5

Transmit a notification message to a service server currently
accessed by user equipment, the notification message being
used for indicating that a user plane path of the user
equipment needs to be changed ─── S210

Receive an impact routing request transmitted by a service
scheduling server, and change, in response to the impact routing
request, the user plane path of the user equipment in a core
network accessed by the user equipment, the impact routing
request being initiated after the service scheduling server
reschedules a service server for the user equipment in response
to a trigger message ─── S230

FIG. 6

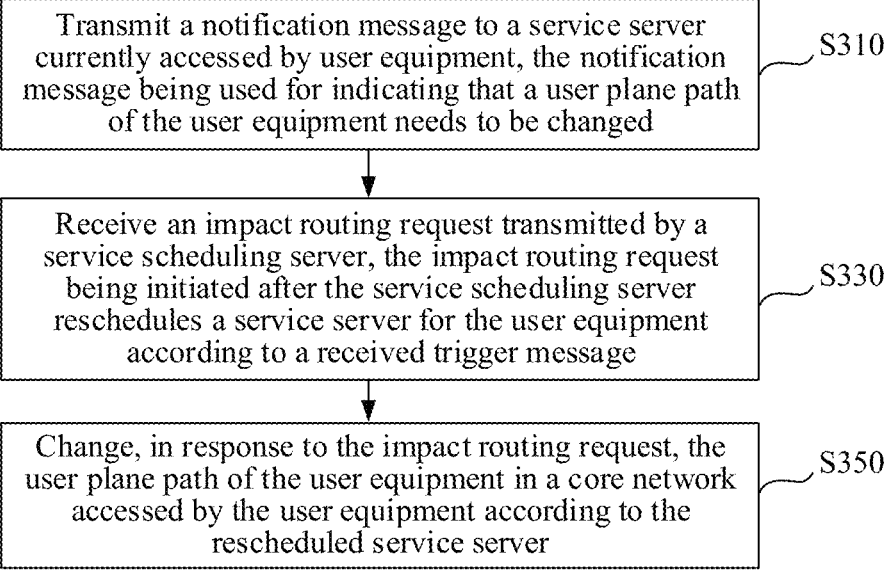

Transmit a notification message to a service server currently accessed by user equipment, the notification message being used for indicating that a user plane path of the user equipment needs to be changed — S310

Receive an impact routing request transmitted by a service scheduling server, the impact routing request being initiated after the service scheduling server reschedules a service server for the user equipment according to a received trigger message — S330

Change, in response to the impact routing request, the user plane path of the user equipment in a core network accessed by the user equipment according to the rescheduled service server — S350

FIG. 7

SWITCHING CONTROL METHOD AND APPARATUS FOR SERVICE SERVER, ELECTRONIC DEVICE, AND STORAGE MEDIUM

RELATED APPLICATION(S)

This application is a continuation application of PCT Patent Application No. PCT/CN2022/073774 filed on Jan. 25, 2022, which claims priority to Chinese Patent Application No. 202110194980.3, entitled "SWITCHING CONTROL METHOD AND APPARATUS FOR SERVICE SERVER, ELECTRONIC DEVICE, AND STORAGE MEDIUM" and filed with the China National Intellectual Property Administration on Feb. 20, 2021, all of which are incorporated herein by reference in entirety.

FIELD OF THE TECHNOLOGY

The present disclosure relates to the field of computer and communication technologies, and particularly, to a switching control method and apparatus for a service server, an electronic device and a computer-readable storage medium.

BACKGROUND

In a 5G (a fifth generation mobile communication technology) network architecture, when user equipment moves and a service server may be reselected, technical problems exist as to how to reselect the service server for the user equipment and how to support service continuity when the service server is switched.

SUMMARY

To resolve the technical problem, embodiments of the present disclosure provide a switching control method and apparatus for a service server, an electronic device and a computer-readable storage medium.

In one aspect, the present disclosure provides a switching control method, performed by an electronic device, the method including: receiving a trigger message for triggering a service scheduling server to reschedule a service server for user equipment; rescheduling, in response to the trigger message, the service server for the user equipment; transmitting an impact routing request to a core network accessed by the user equipment, the impact routing request being used for triggering the core network to change a user plane path of the user equipment; and transmitting an Internet Protocol (IP) address of the rescheduled service server to the user equipment, to trigger the user equipment to switch a currently accessed service server to the rescheduled service server.

In another aspect, the present disclosure provides a switching control method, performed by an electronic device, the method including: transmitting a notification message to a service server currently accessed by user equipment, the notification message being used for indicating that a user plane path of the user equipment is to be changed; and receiving an impact routing request transmitted by a service scheduling server, and changing, in response to the impact routing request, the user plane path of the user equipment in a core network accessed by the user equipment, the impact routing request being initiated after the service scheduling server reschedules a service server for the user equipment in response to a trigger message.

In yet another aspect, the present disclosure provides a switching control method, performed by an electronic device, the method including: transmitting a notification message to a service server currently accessed by user equipment, the notification message being used for indicating that a user plane path of the user equipment is to be changed; and receiving an impact routing request transmitted by a service scheduling server, the impact routing request being initiated after the service scheduling server reschedules a service server for the user equipment according to a received trigger message; and changing, in response to the impact routing request, the user plane path of the user equipment in a core network accessed by the user equipment according to the rescheduled service server.

In yet another aspect, the present disclosure provides a switching control apparatus, the apparatus including: a memory storing computer program instructions; and a processor coupled to the memory and configured to execute the computer program instructions and perform: receiving a trigger message for triggering a service scheduling server to reschedule a service server for user equipment; rescheduling, in response to the trigger message, the service server for the user equipment; transmitting an impact routing request to a core network accessed by the user equipment, the impact routing request being used for triggering the core network to change a user plane path of the user equipment; and transmitting an Internet Protocol (IP) address of the rescheduled service server to the user equipment, to trigger the user equipment to switch a currently accessed service server to the rescheduled service server.

In yet another aspect, the present disclosure provides a switching control apparatus, the apparatus including: a memory storing computer program instructions; and a processor coupled to the memory and configured to execute the computer program instructions and perform: transmitting a notification message to a service server currently accessed by user equipment, the notification message being used for indicating that a user plane path of the user equipment is to be changed; and receiving an impact routing request transmitted by a service scheduling server, and changing, in response to the impact routing request, the user plane path of the user equipment in a core network accessed by the user equipment, the impact routing request being initiated after the service scheduling server reschedules a service server for the user equipment in response to a trigger message.

In yet another aspect, the present disclosure provides a switching control apparatus, the apparatus including: a memory storing computer program instructions; and a processor coupled to the memory and configured to execute the computer program instructions and perform: transmitting a notification message to a service server currently accessed by user equipment, the notification message being used for indicating that a user plane path of the user equipment is to be changed; and receiving an impact routing request transmitted by a service scheduling server, the impact routing request being initiated after the service scheduling server reschedules a service server for the user equipment according to a received trigger message; and changing, in response to the impact routing request, the user plane path of the user equipment in a core network accessed by the user equipment according to the rescheduled service server.

In yet another aspect, the present disclosure provides a computer-readable storage medium, storing computer-readable instructions, the computer-readable instructions, when executed by a processor, causing the computer to perform the switching control method for a service server provided in the optional embodiments.

It is to be understood that the general descriptions and the following detailed descriptions are merely for illustration and explanation purposes and are not intended to limit the present disclosure.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

FIG. 5 is a schematic flowchart of a switching control method for a service server according to certain embodiment(s) of the present disclosure;

FIG. 6 is a schematic flowchart of a switching control method for a service server according to certain embodiment(s) of the present disclosure;

FIG. 7 is a schematic flowchart of a switching control method for a service server according to certain embodiment(s) of the present disclosure;

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change.

"Plurality of" mentioned in the present disclosure means two or more. And/or describes an association relationship for describing associated objects and represents that three relationships may exist. For example, A and/or B may represent the following three scenarios: only A exists, both A and B exist, and only B exists. The character "I" generally indicates an "or" relationship between the associated objects.

Figure 1:
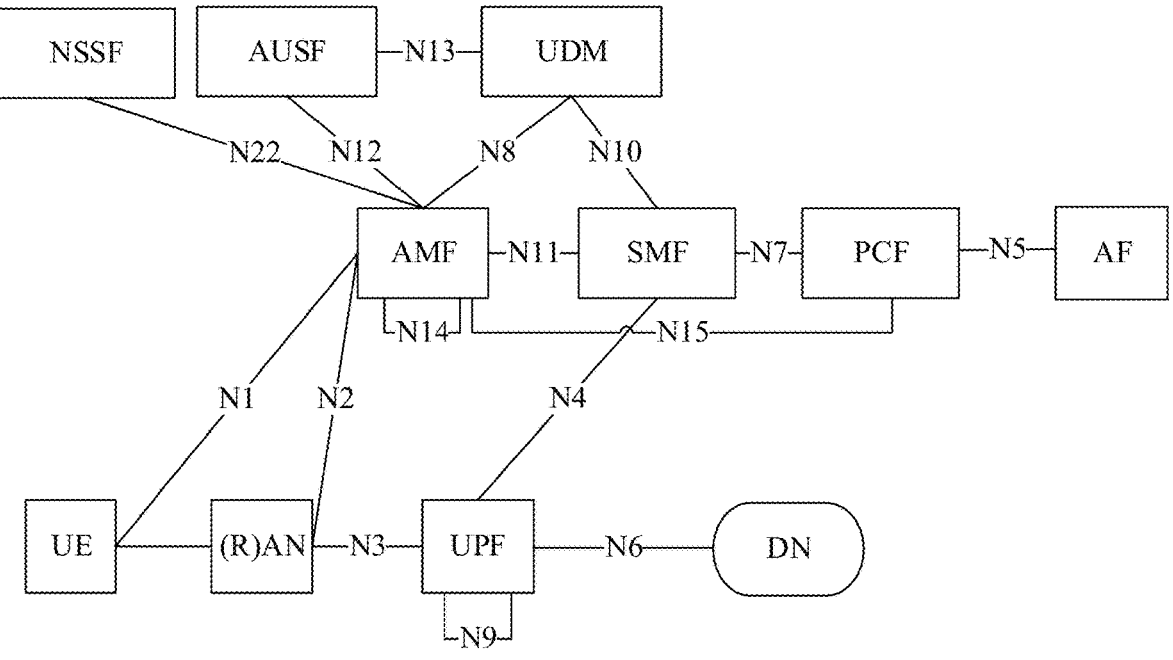
FIG. 1 is a schematic diagram of a 5G network architecture according to certain embodiment(s) of the present disclosure.

FIG. 1 is a schematic diagram of a 5G (a fifth generation mobile communication technology) network architecture according to an exemplary embodiment of the present disclosure.

As shown in FIG. 1, the 5G mobile communication network includes function entities such as user equipment (UE), a (radio) access network ((R)AN), a user plane function (UPF), an access and mobility management function (AMF), a session management function (SMF), an application function (AF), and a policy control function (PCF). The AMF, SMF and UPF are network functions of the 5G core network. The AMF is responsible for implementing UE access and mobility management, the SMF is responsible for implementing user plane session management, and the UPF is responsible for implementing packet routing and forwarding between the (R)AN and a data network (DN).

Technical solutions of the embodiments of the present disclosure are proposed based on the 5G network architecture shown in FIG. 1, and an implementation procedure of switching control of a service server is proposed. In this implementation procedure, on the one hand, a service scheduling server reschedules a service server for the UE, and transmits an IP address of the rescheduled service server to the UE, and on the other hand, the service scheduling server initiates an impact routing request that is used for triggering the 5G core network to change a user plane path of the UE according to the rescheduled service server. The UE can obtain the IP address of the rescheduled service server, and the user plane path of the UE is changed correspondingly in the 5G core network, service access performed by the UE may continue when the service server is switched, and the user cannot perceive the interruption of the service, thereby realizing the guarantee of service continuity when the service server is switched.

In various embodiments of the present disclosure, a service server accessed by the UE before the service server is switched should be a service server deployed in a network closer to the UE, such as an edge service server described in the following embodiments.

The 5G network architecture supports the expansion and addition of the network functions when the service server is switched. Therefore, this solution can be further extended to newly added network functions that implement similar functions, without limiting a specific execution entity of the newly added functions of this solution.

Figure 2:
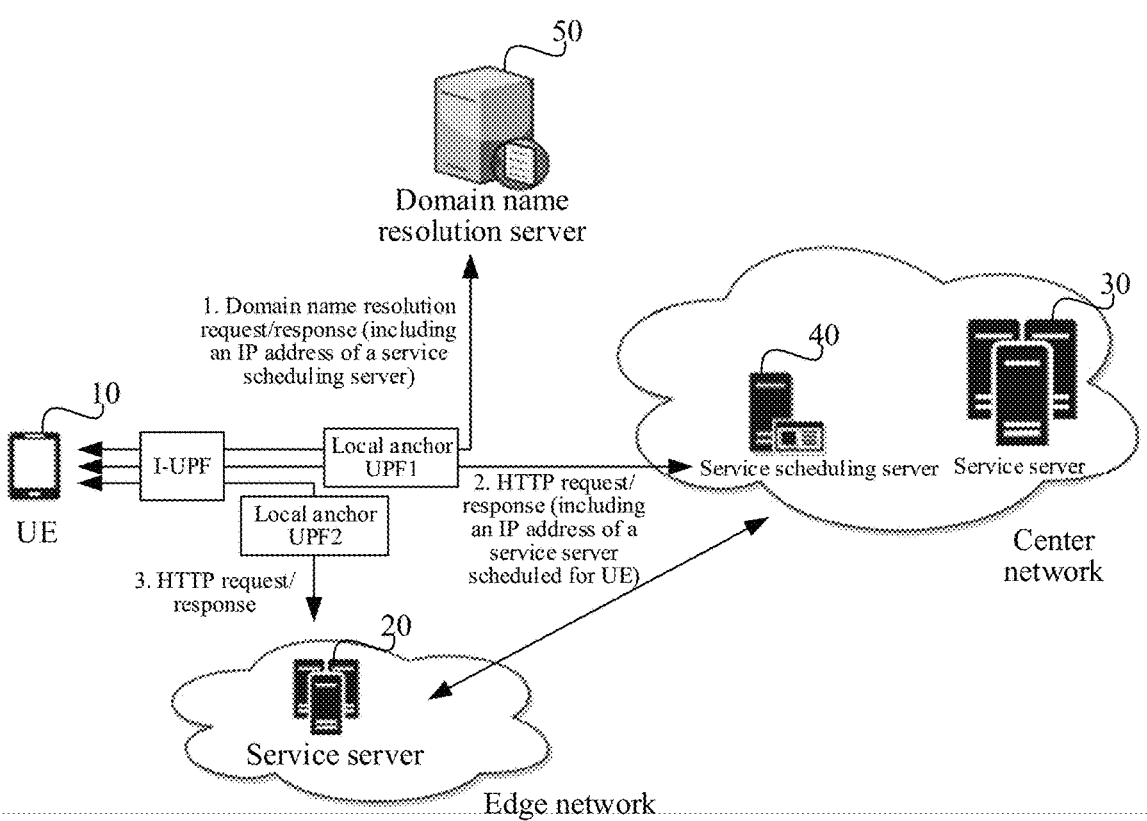
FIG. 2 is a schematic diagram of an implementation environment based on the network architecture shown in FIG. 1.

FIG. 2 is a schematic diagram of an implementation environment according to the present disclosure. The implementation environment is a service scheduling system proposed based on the 5G network architecture shown in FIG. 1, including UE 10, a service server 20 deployed in an edge network, a service server 30 deployed in a center network, a service scheduling server 40 and a domain name resolution server 50.

The edge network and the center network refer to network locations where the service server is deployed. The edge network is closer to a user end, to reduce a delay for a user to access the service server. The center network corresponds to the edge network and is usually deployed in a data center of the cloud, which is far away from a location accessed by the user. The service server 20 deployed in the edge network may be referred to as an edge service server, and there are usually a plurality of edge service servers. Correspondingly, the service server 30 deployed in the center network may be referred to as a center service server. Usually, the service scheduling server 40 is deployed in the center network.

Under this network architecture, the UPF can be deployed in a form that supports packet routing and forwarding, for example, the intermediate UPF (I-UPF) and a plurality of local anchors UPF1 and UPF2 deployed in FIG. 2. The I-UPF can act as an uplink classifier to realize data flow offloading; and the local anchor UPF acts as a UPF to access the edge network.

A hyper text transfer protocol (HTTP) communication connection or a hyper text transfer protocol over secure socket layer (HTTPS) communication connection is established between the UE 10 and the service server 20 and the service scheduling server 40 deployed in the edge network. For example, as shown in FIG. 2, by transmitting a domain name resolution request to a domain name resolution server 50, the UE 10 obtains an IP address of the service scheduling server 40 returned by the domain name resolution server 50, and initiates an HTTP request to the service scheduling server 40 according to the obtained IP address of the service scheduling server 40. The service scheduling server 40, in response to the HTTP request, schedules a corresponding service server for the service requested by the UE 10, and transmits an IP address of the scheduled service server to the UE 10 by way of an HTTP response. The UE 10 performs a HTTP request and response with the service server (the edge service server 20 shown in FIG. 2) according to the IP address of the service server received this time, thereby realizing a service access by the UE to the service server.

When the service server currently accessed by the UE 10 may be switched, the core network accessed by the UE 10 transmits a notification message to the service server currently accessed by the UE 10 to indicate that the user plane path of the UE 10 may be changed. The service server currently accessed by the UE 10 transmits the IP address of the service scheduling server 40 to the UE 10 in response to the notification message. The UE 10 initiates a service scheduling request to the service scheduling server 40 according to the received IP address, to request the service scheduling server 40 to reschedule the service server for it. On the one hand, the service scheduling server 40 reschedules a service server for the UE 10, and transmits the IP address of the rescheduled service server to the UE 10 in response to the service scheduling request transmitted by the UE 10. On the other hand, the service scheduling server 40 initiates an impact routing request for triggering the core network to change the user plane path of the UE 10 according to the rescheduled service server. The user plane path of the UE 10 can be understood as a routing and forwarding path of the service data between the UE 10 and the local anchor UPF when the UE 10 accesses the service. The service server rescheduled by the service scheduling server 40 may be an edge service server or a center service server, which is not limited herein.

The service server rescheduled by the service scheduling server 40 for the UE 10 may be another edge service server deployed in the edge network, or may further be a center service server deployed in a center network, which is not limited herein.

The UE 10 in the system shown in FIG. 2 may be electronic devices such as a smartphone, a tablet computer, a notebook computer, a desktop computer, a smart speaker, a smart watch, and an in-vehicle computer, which is not limited therein. The service server 20 and/or the service server 30 may be an independent physical server, or may be a server cluster or a distributed system formed by a plurality of physical servers, where the plurality of servers can form a blockchain and the servers are nodes on the blockchain, or may further be a cloud server that provides cloud computing services such as a cloud service, a cloud database, cloud computing, a cloud function, cloud storage, a network service, cloud communication, a middleware service, a domain name service, a security service, a content delivery network (CDN), big data, and an AI platform, which is not limited herein.

Figure 3:
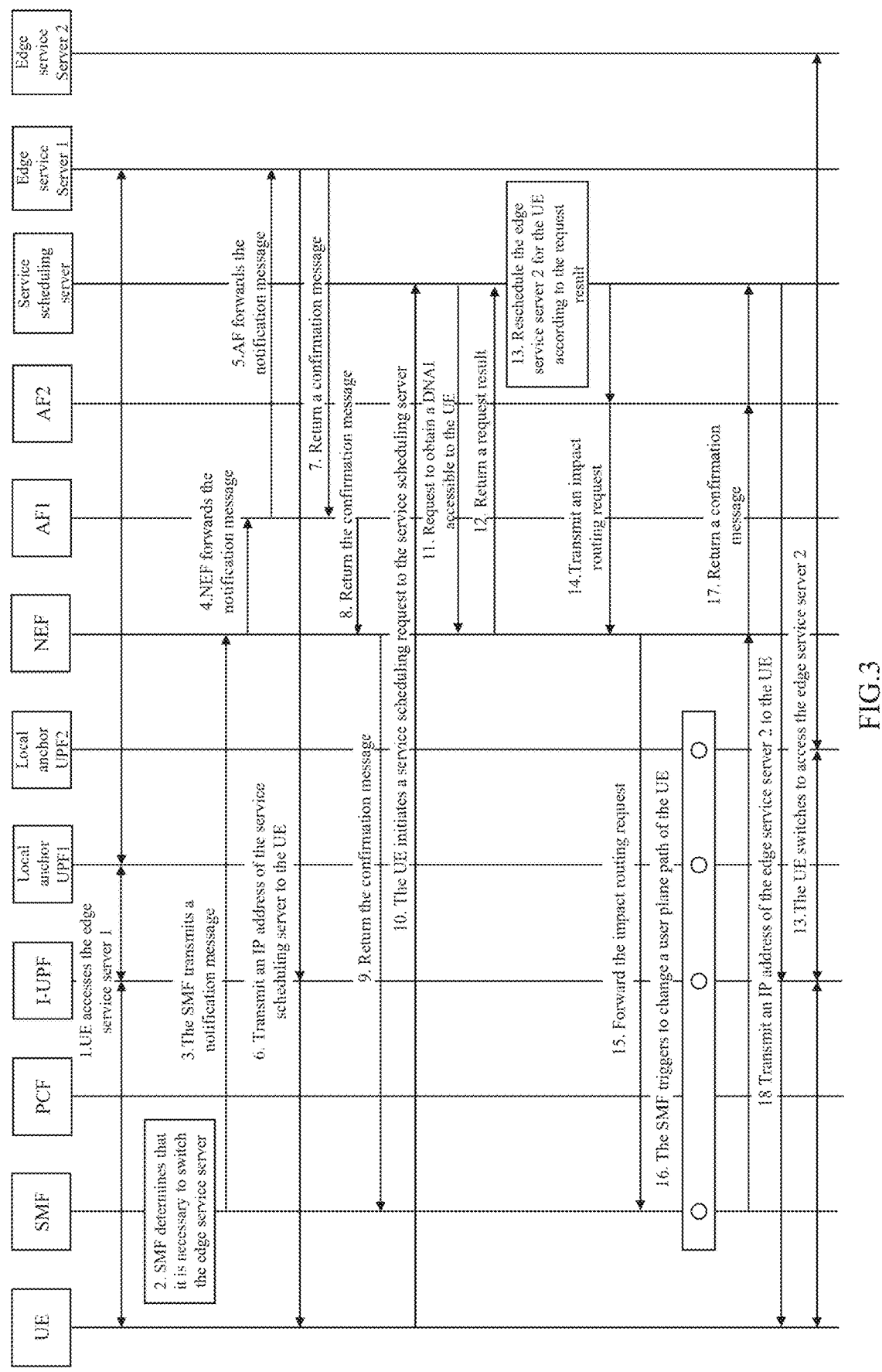
FIG. 3 is a schematic diagram of a service procedure of realizing service server switching according to certain embodiment(s) of the present disclosure.

FIG. 3 is a schematic diagram of a service procedure of realizing service server switching under a 5G mobile communication network according to an exemplary embodiment of the present disclosure. As shown in FIG. 3, in an exemplary service procedure, UE implements service access to an edge service server 1 through an intermediate UPF (I-UPF) and a local anchor UPF1.

During the process of the UE accessing an edge service server 1, when the UE moves, due to a change of an access location of the user, the edge service server 1 may no longer be the best access node of the UE. That is, at an updated access location of the UE, there are more suitable edge networks and edge service servers. The SMF can judge whether it is desirable to switch the edge service server according to location information of the UE after moving and data network access identifier information (DNAI information, which corresponds to the deployment of the edge network). The judgment of the SMF that whether it is desirable to switch the edge service server may be set according to an actual situation, which is not limited in this embodiment.

When the SMF judges that the edge service server 1 currently accessed by the UE may be switched, the SMF transmits a notification message to an AF1, and transmits the notification message to the edge service server 1 currently accessed by the UE through the AF1. The SMF can determine information of the AF1 according to a subscription of AF1. The notification message includes an instruction for changing a user plane path of the UE, an IP address of the UE, and may further include at least one of a DNAI and duration desired for the path change. The DNAI included in the notification message corresponds to a data network of an edge service server accessible to the UE, and the duration desired for the path change refers to duration desired for a 5G core network to perform the user plane path change of the UE.

The SMF can also transmit the notification message to the AF1 through a network exposure function (NEF). When the notification message includes a DNAI, the NEF can further save the DNAI included in the notification message.

After receiving the notification message, the edge service server 1 transmits an IP address of the service scheduling server to the UE, for example, transmits the IP address of the service scheduling server to the UE by way of HTTP redirection.

The edge service server 1 further returns a confirmation message to the AF1, and the confirmation message indicates that the edge service server 1 has transmitted the IP address of the service scheduling server to the UE.

The UE transmits a service scheduling request to the service scheduling server according to the IP address of the service scheduling server transmitted by the edge service server 1. In response to the service scheduling request, the service scheduling server requests the NEF to obtain a DNAI accessible to the UE.

According to the request of the service scheduling server, the NEF searches for a locally stored DNAI, where the locally stored DNAI is also the DNAI included in the notification message, and returns a search result to the service scheduling server as a request result. When the notification message does not include a DNAI, the request result returned by the NEF to the service scheduling server does not include DNAI information.

The service scheduling server reschedules a service server for the UE according to the request result returned by the NEF. If the request result includes DNAIs, a target DNAI is selected from these DNAIs, and an edge service server corresponding to the target DNAI is used as the rescheduled edge service server. When there are a plurality of edge service servers corresponding to the target DNAI, the service scheduling server may select one from the plurality of edge service servers corresponding to the target DNAI.

Unless otherwise specified, the edge service server corresponding to the DNAI in the following description refers to selecting an edge service server from the plurality of edge service servers corresponding to the DNAI.

When the request result includes a plurality of DNAIs, the service scheduling server selects one of the DNAIs as a target DNAI, and when the request result includes only one candidate DNAI, this DNAI is used as the target DNAI.

In response to a determination that the request result does not include DNAIs, or even if the DNAIs are included, but none of the edge service servers in these DNAIs are selected by the service scheduling server, the service scheduling server schedules a center service server deployed in a center network to provide service services for the UE.

After determining a rescheduled edge service server, the service scheduling server transmits an impact routing request to the NEF, where the impact routing request is used for triggering a core network accessed by the UE to correspondingly change a user plane path of the UE according to the rescheduled service server.

If the service scheduling server schedules the edge service server deployed in the edge network to provide service services for the UE, the impact routing request may include a target DNAI corresponding to the edge service server, or include the target DNAI and an IP address of the edge service server.

If the rescheduled service server is a center service server, the impact routing request may include an offload message corresponding to the user plane path change. The offload message indicates that it is not necessary to establish an offload path for the UE, and the SMF does not need to establish an offload path when changing the user plane path of the UE, nor does it need to issue an offload address (not shown in FIG. 3).

The service scheduling server can transmit an impact routing request to the NEF through an AF1, and can also transmit an impact routing request to the NEF through an AF2. The AF1 and the AF2 are application function entities deployed in different locations. The service scheduling serve can select specific application function entities according to an actual situation, which is not limited herein.

In the implementation of the service procedure shown in FIG. 3, the service server rescheduled by the service scheduling server for the UE is an edge service server 2, and a network distance between the AF2 and the service scheduling server is smaller and there is a direct network connection. The service scheduling server transmits an impact routing request to the NEF through the AF2.

The NEF may transmit the impact routing request to the SMF, so that the SMF triggers the change of the user plane path of the UE according to the received impact routing request. As shown in FIG. 3, if the impact routing request includes a target DNAI corresponding to the edge service server 2, and a data network corresponding to the target DNAI may be routed and forwarded by the local anchor UPF2, the local anchor UPF1 is switched to the local anchor UPF2, and an IP address of the edge service server 2 is configured on the I-UPF as an offload address.

In some embodiments, the I-UPF may be switched in the process of changing the user plane path of the UE. If the I-UPF is switched at the same time, the IP address of the edge service server 2 is configured on a new I-UPF as an offload address. Whether it is desirable to switch the I-UPF at the same time may be determined according to the actual situation, such as updated location information of the UE, deployment of the network.

For example, in the implementation of the service procedure shown in FIG. 3, before an edge service server 1 is switched, a user plane path of the UE is UE→I-UPF→local anchor UPF1, and after the edge service server 1 is switched, the user plane path of the UE is changed to UE→I-UP-F→local anchor UPF2.

It can be understood that, on the user plane path, the I-UPF may be the same or different. The user plane path includes nodes in the access network, such as base stations. Only when the change of the UE location causes the change of the node (such as the base station) in the access network, it may cause the change of the user plane path of the core network. However, the switching of the node in the access network does not affect the implementation of this solution, and the solution considers the switching of the user plane path of the core network, so description of the switching with the node in the access network is omitted in this solution.

After the NEF transmits the impact routing request to the SMF, or after the NEF learns that the user plane path change of the UE is performed, the NEF further returns a confirmation message to the service scheduling server. The service scheduling server transmits an IP address of the rescheduled service server to the UE according to the confirmation message returned by the NEF, so that the UE switch to access the rescheduled service server according to the IP address of the rescheduled service server, thereby realizing the switching of the service server.

Alternatively, in some embodiments, the service scheduling server does not need to wait to receive the confirmation message returned by the NEF after transmitting the impact routing request to the NEF, but transmits the IP address of the rescheduled service server to the UE, and sends a timer (also not shown in FIG. 3). The duration indicated by the timer is greater than or equal to the duration desired for the path change included in the notification message, and the timer is used for triggering the UE to switch to access the rescheduled service server after the timer expires.

By executing the service procedure, since the UE already learns the IP address of the edge service server 2 or the center service server that may be switched and accessed, the switching of the edge service server 2 or the center service server in the core network also changes the user plane path of the UE correspondingly. Therefore, when the UE can switch to access the edge service server 2 or the center service server, the service access in the UE may continue, the service access perceived by the user will not be interrupted, and the service continuity when the service server is switched is realized.

Figure 4:
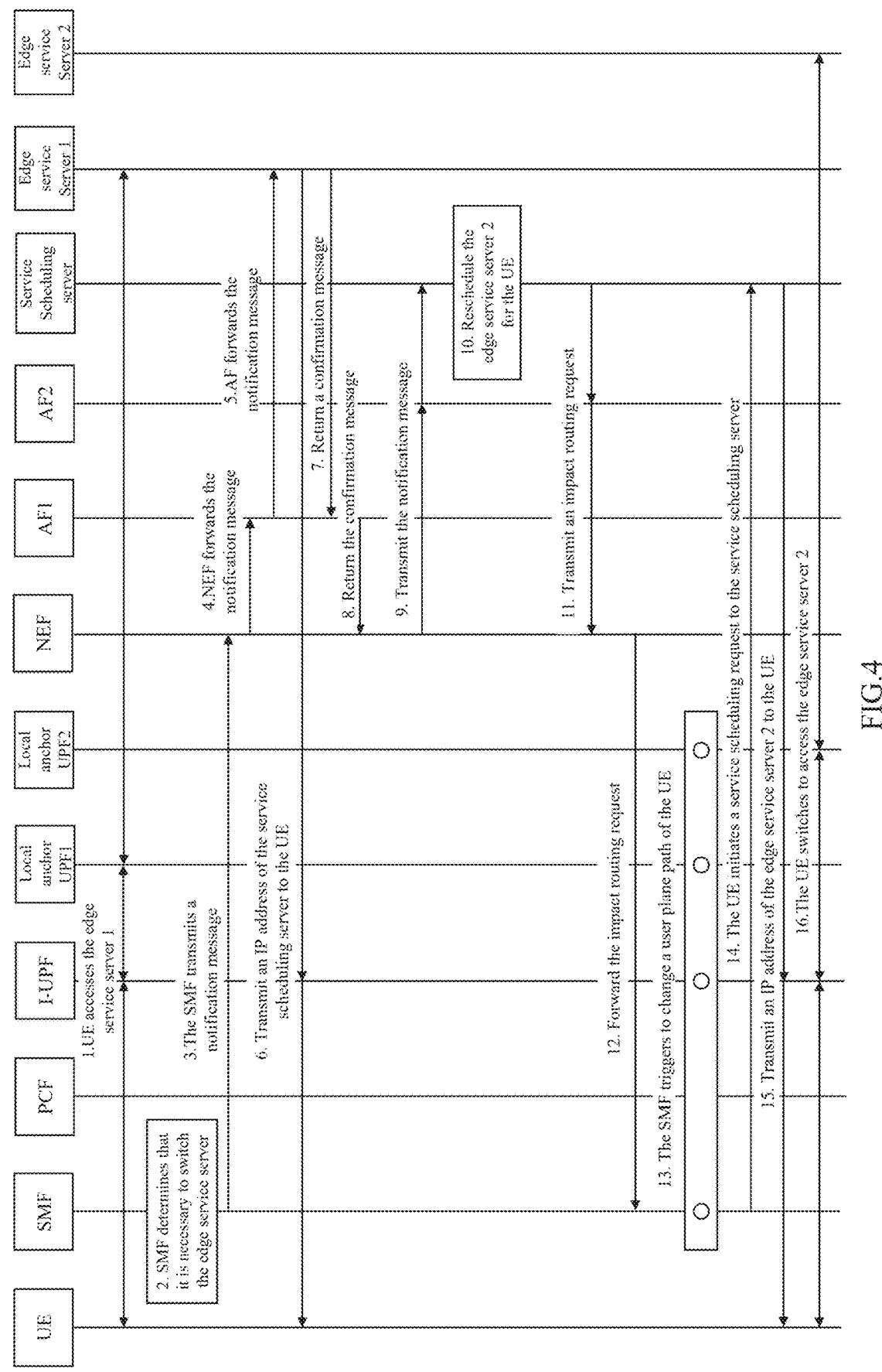
FIG. 4 is a schematic diagram of a service procedure of realizing service server switching according to certain embodiment(s) of the present disclosure.

FIG. 4 is a schematic diagram of a service procedure of realizing service server switching under a 5G mobile communication network according to another exemplary embodiment of the present disclosure. As shown in FIG. 4, in this exemplary service procedure, UE still implements service access to an edge service server 1 through an intermediate UPF (I-UPF) and a local anchor UPF1.

A part of the service procedure shown in FIG. 4 is the same as a part of the service procedure shown in FIG. 3, such as the procedure that the SMF transmits a notification message to the edge service server 1, and the NEF receives the impact routing request transmitted by the service scheduling server, and triggers the core network to change the user plane path of the UE. These same procedures will not be described in detail below.

As shown in FIG. 4, after transmitting the IP address of the service scheduling server to the UE according to the notification message transmitted by the AF1, the edge service server 1 still returns a confirmation message to the NEF through the AF1. The confirmation message includes information indicating the change of an endpoint and an endpoint address, where the endpoint address is the IP address of the service scheduling server, and the confirmation message is used for indicating that the NEF may transmit the notification message to another server, that is, the service scheduling server.

When there is no direct connection between the AF1 and the service scheduling server, the AF1 transmits the confirmation message to the NEF. After receiving the confirmation message, the NEF transmits a notification message indicating that a user plane path of the UE may be changed to the service scheduling server through the AF2.

The service scheduling server reschedules a service server for the UE in response to the notification message transmitted by the NEF. In certain embodiment(s), the service scheduling server reschedules the edge service server for the UE according to DNAI information included in the notification message transmitted by the NEF. When the notification message does not include the DNAI, the service scheduling server dispatches a center service server to provide service services for the UE. Details are not described herein.

After determining a rescheduled service server, the service scheduling server transmits an impact routing request to the NEF through the AF2, where the impact routing request is used for triggering a core network accessed by the UE to correspondingly change a user plane path of the UE. For example, the NEF may transmit the impact routing request to the SMF, so that the SMF triggers the change of the user plane path of the UE according to the received impact routing request.

Since the UE has learned the IP address of the service scheduling server, the UE can initiate a service scheduling request to the service scheduling server. In response to the service scheduling request, the service scheduling server transmits the IP address of the rescheduled service server to the UE, so that the UE switches to access the rescheduled service server, thereby realizing the switching of the service server.

By executing the service procedure, since the UE already learns the IP address of the edge service server 2 or the center service server that may be switched and accessed, the switching of the edge service server 2 or the center service server in the core network also changes the user plane path of the UE correspondingly. Therefore, when the UE can switch to access the edge service server 2 or the center service server, the service access in the UE may continue, the service access perceived by the user will not be interrupted, and the service continuity when the service server is switched is realized.

FIG. 5 is a flowchart of a switching control method for a service server according to an exemplary embodiment of the present disclosure. The method may be applicable to the implementation environment shown in FIG. 2, and executed by the service scheduling server 40 in the implementation environment shown in FIG. 2.

In other implementation environments, such as a service scheduling system proposed based on other types of network architectures, the method may be executed by an electronic device that plays a service scheduling role in the service scheduling system, which is not limited in this embodiment.

The other types of network architectures may be a network function expansion and a newly added architecture on the 5G network architecture shown in FIG. 1, that is, the method may be further extended to a newly added network function that implement similar functions, which is not limited in this embodiment.

In this embodiment, details of the method are described by taking the method being applicable to a service scheduling server as an example. The service server mentioned in the method is a server that provides service services for the UE. For example, it may be an edge service server or a center service server shown in the implementation environment in FIG. 2, or other forms of service servers. This is not limited in this embodiment.

The method in this embodiment is applicable to the service server accessed by the UE before the service server is switched being a service server deployed in a network close to the UE, such as an edge service server deployed in an edge network.

As shown in FIG. 5, the method may include S110 to S170. A detailed description is as follows:

S110: Receive a trigger message for triggering a service scheduling server to reschedule a service server for user equipment.

In this embodiment, the trigger message may be a service scheduling request transmitted by the UE to a service scheduling server. For example, in the service procedure as shown in FIG. 3, the UE transmits a service scheduling request to the service scheduling server according to an IP address of the service scheduling server. After receiving the service scheduling request transmitted by the UE, the service scheduling server reschedules a service server for the UE in response to the service scheduling request.

The IP address of the service scheduling server may be pre-stored in the UE, or may be transmitted to the UE by a service server currently accessed by the UE. This embodiment does not limit the manner in which the UE obtains the service scheduling server.

For example, a core network accessed by the UE can determine whether to switch an edge service server according to location information after the user moves or DNAI information, where the DNAI information corresponds to deployment of the edge network. If there is a more suitable edge network deployment at a moved location of the UE, the core network transmits a notification message to an AF1. For example, the SMF transmits the notification message to the AF1 through the NEF, so that the notification message is forwarded to the service server currently accessed by the UE through the AF1. After receiving the notification message, the service server currently accessed by the UE transmits the IP address of the service scheduling server to the UE.

The SMF can obtain information of the AF1 according to a subscription of the AF1, and the SMF can save a DNAI included in the notification message locally. The notification message includes an instruction for changing a user plane path of the UE, so the notification message can be used to indicate that the user plane path of the UE may be changed. The notification message may further include an IP address of the UE. The notification message may further include at least one of a DNAI and duration desired for the path change, and the DNAI included in the notification message refers to a DNAI corresponding to a service server that can be switched by the UE, and there may be one or more DNAIs. The duration desired for the path change refers to duration desired for a 5G core network to perform the user plane path change of the UE.

The trigger message may further be transmitted to the service scheduling server by the NEF in the core network accessed by the UE. For example, in the service procedure shown in FIG. 4, after receiving a confirmation message transmitted by the service server currently accessed by the UE, the NEF transmits a notification message to the service scheduling server, and the notification message is used as a trigger message for triggering the service scheduling server to reschedule the service server for the user equipment.

S130: Reschedule the service server for the user equipment in response to the trigger message.

When the trigger message is a service scheduling request transmitted by the user equipment, the service scheduling server, in response to the service scheduling request transmitted by the UE, requests a core network accessed by the UE to obtain a DNAI accessible to the UE, and the core network correspondingly returns a request result to the service scheduling server. The service server is rescheduled for UE according to a request result returned by the core network.

For example, the service scheduling server may initiate a request to the NEF in the core network to obtain a DNAI accessible to the UE through an AF1 or an AF2. The AF1 and the AF2 are application function entities deployed in different locations, which can be selected by the service scheduling server according to an actual situation. For example, if the AF2 is closer to the service scheduling server and has a direct network connection with the service scheduling server, the service scheduling server selects the AF2 to transmit a request to the NEF.

In response to the request of the service scheduling server, the NEF may search for locally stored DNAI information, where the locally stored DNAI information is the DNAI included in the notification message. The NEF returns the request result to the service scheduling server according to a search result.

The request result returned by the NEF may or may not include DNAI information. If there are a plurality of DNAIs in the request result, the service scheduling server selects one DNAI from these DNAIs as a target DNAI, and uses the target DNAI as a DNAI corresponding to the service server rescheduled for the UE. When there are a plurality of service servers corresponding to the target DNAI, the service scheduling server may select one from the plurality of service servers corresponding to the target DNAI as a rescheduled service server for the UE.

When the request result includes only one DNAI, this DNAI is used as the target DNAI.

According to the selected target DNAI, the service scheduling server may obtain an IP address of the service server corresponding to the target DNAI. For example, the service scheduling server may pre-configure a corresponding between the target DNAI and the IP address of the service server. According to the corresponding, the service scheduling server can obtain the IP address of the service server, which is not limited herein.

In response to a determination that the request result does not include DNAIs, or even if the DNAIs are included, but none of the edge service servers corresponding to a DNAI in these DNAIs are selected by the service scheduling server, the service scheduling server may schedule a center service server deployed in a center network to provide service services for the UE. The center service server is a service server corresponding to the edge network server deployed in the edge network, and reference may be made to the descriptions in the embodiments.

If the trigger message is a notification message transmitted by the NEF to the service scheduling server after receiving the confirmation message transmitted by the service server currently accessed by the UE. For example, after the SMF transmits the notification message to the NEF, the NEF saves the notification message, to transmit the notification message to the service scheduling server after receiving the confirmation message transmitted by the service server currently accessed by the UE. The service scheduling server may reschedule the service server for the UE according to the DNAI information included in the notification message transmitted by the NEF. Details are not described herein.

S150: Transmit an impact routing request to a core network accessed by the user equipment, the impact routing request being used for triggering the core network to change a user plane path of the user equipment.

As described above, the rescheduled service server may be a service server corresponding to a target DNAI, or may be a center service server. If the service server corresponding to the target DNAI is rescheduled to provide service services for the UE, the impact routing request may include the target DNAI, or include the target DNAI and an IP address of the rescheduled service server. The core network changes the user plane path of the UE according to the received impact routing request, such as switching a local offload path, and the local anchor UPF after switched should be a local anchor UPF corresponding to the target DNAI.

If the center service server is rescheduled to provide a service server for the UE, the impact routing request carries an offload message corresponding to the user plane path change, and the offload message indicates that an offload path is not established for the UE. The core network deletes an original offload path of the UE according to the received impact routing request, and only may keep the anchor point UPF corresponding to accessing the center service server.

The service scheduling server transmits an impact routing request to the AF1 or the AF2, to forward the impact routing request to the core network through the AF1 or the AF2, for example, to the SMF in the core network. In some embodiments, the AF1 or the AF2 may further transmit the impact routing request to the SMF through the NEF.

S170: Transmit an IP address of the rescheduled service server to the user equipment, to trigger the user equipment to switch a currently accessed service server to the rescheduled service server.

In this embodiment, the IP address of the rescheduled service server may be transmitted to the UE, so that the UE switches to access the rescheduled service server according to the received IP address, thereby realizing the switching of the service server.

The service scheduling server may transmit the IP address of the rescheduled service server to the UE after receiving the confirmation message returned by the core network for the impact routing request. For example, after forwarding the impact routing request transmitted by the service scheduling server to the SMF, the NEF can return the confirmation message to the service scheduling server, or, after receiving the confirmation message returned by the SMF for the impact routing request, the NEF returns the confirmation message to the service scheduling server.

The confirmation message returned by the core network to the service scheduling server is used for indicating that the user plane path of the UE has been changed in the core network according to the impact routing request, and the UE can also successfully access a new service server according to the received IP address of the rescheduled service server.

Or, after transmitting the impact routing request to the core network, the service scheduling server transmits the IP address of the rescheduled service server to the UE, and at the same time transmits a timer to the UE. Duration specified by the timer is greater than or equal to duration desired for the path change included in the notification message. The timer is used for triggering the UE to switch to access the rescheduled service server after the timer expires, which can ensure that the UE accesses the new service server according to the received IP address of the rescheduled service server, so that the corresponding user plane path change has been performed in the core network.

Therefore, in the technical solution provided in this embodiment, since the UE can learn the IP address of the service server that may be switched to access, and the core network also correspondingly changes the user plane path of the UE for the switching of the service server. Therefore, the UE can successfully switch to access a new service server, the service access in the UE may continue, and the service access perceived by the user will not be interrupted, thereby realizing the service continuity when the service server is switched.

FIG. 6 is a flowchart of a switching control method for a service server according to another exemplary embodiment of the present disclosure. The method may be executed by the NEF in the 5G core network, or in some embodiments, the method may be executed by a function entity with the same network function as the NEF included in other types of mobile networks, which is not limited in this embodiment. In this embodiment, the NEF is used as an exemplary execution entity to describe the method of this embodiment.

The service server mentioned in the method of this embodiment may be a service server that provides service services for the UE. For example, it may be an edge service server or a center service server shown in the implementation environment in FIG. 2, or other forms of service servers. This is not limited in this embodiment.

A service server accessed by the UE before the service server is switched refers to a service server deployed in a network closer to the UE, such as an edge service server deployed in an edge network.

As shown in FIG. 6, the method may include S210 to S230. A detailed description is as follows:

S210: Transmit a notification message to a service server currently accessed by user equipment, the notification message being used for indicating that a user plane path of the user equipment may be changed.

As described above, the SMF in the core network accessed by the UE can determine whether to switch the service server according to location information after the user moves or DNAI information. The SMF transmits a notification message to the NEF if the service server may be switched.

The NEF transmits the received notification message to a service server currently accessed by the UE. After receiving the notification message transmitted by the NEF, the service server currently accessed by the UE transmits an IP address of the service scheduling server to the UE in response to the notification message.

The notification message includes an instruction for changing a user plane path of the UE, so the notification message can be used to indicate that the user plane path of the UE may be changed. The notification message further includes an IP address of the UE. The notification message may further include a DNAI, and the DNAI included in the notification message refers to a DNAI corresponding to a service server that can be switched by the UE, and there may be one or more DNAIs. If the notification message includes a DNAI, the NEF can store the DNAI in the notification message locally.

S230: Receive an impact routing request transmitted by a service scheduling server, and change, in response to the impact routing request, the user plane path of the user equipment in a core network accessed by the user equipment, the impact routing request being initiated after the service scheduling server reschedules a service server for the user equipment in response to a trigger message.

The service scheduling server reschedules a service server for the UE according to the service scheduling request transmitted by the UE or the notification message transmitted by the NEF, and transmits an impact routing request to the NEF, to trigger the core network to correspondingly change the user plane path of the UE through the impact routing request.

The impact routing request indicates that the service scheduling server schedules a new service server to provide service services for the UE. If the new service server is an edge service server, the impact routing request includes a DNAI corresponding to the edge service server, or includes the DNAI and an IP address corresponding to the edge service server.

If the service scheduling server schedules a center service server to provide service services for the UE, the impact routing request carries an offload message corresponding to the user plane path change. Therefore, the NEF will receive the offload message.

In response to the impact routing request, the NEF triggers the user plane path change of the UE in the core network. For example, the NEF transmits the impact routing request to the SMF, so that the SMF triggers to change the user plane path of the UE in response to the impact routing request.

The NEF can communicate with one or more AFs deployed in different locations. For example, the NEF transmits a notification message to a service server currently accessed by the UE through the AF1, and the NEF communicates with the service scheduling server through the AF2, which can be selected according to an actual situation. For example, if the AF1 is closer to the NEF and has a direct network connection with the NEF, the NEF transmits the notification message to the service server currently accessed by the UE through the AF1; and if the AF2 is closer to the service scheduling server and has a direct network connection with the service scheduling server, the NEF communicates with the service scheduling server through the AF2.

In another embodiment, after step S210, the method further includes: transmitting a data network access identifier accessible to the user equipment to the service scheduling server after the service scheduling server receives a service scheduling request transmitted by the user equipment.

That is, after responding to the service scheduling server receiving a service scheduling request transmitted by the user equipment, the initiated request for obtaining the data network access identifier accessible to the user equipment returns a request result to the service scheduling server.

As described above, after receiving the IP address of the service scheduling server, the UE transmits a service scheduling request to the service scheduling server according to the IP address of the service scheduling server. The service scheduling request is used for indicating that the service scheduling server reschedules a service server that can provide a service for the service accessed by the UE. According to the received service scheduling request, the service scheduling server transmits to the NEF a request for obtaining the DNAI accessible to the UE.

In response to the request transmitted by the service scheduling server to obtain the DNAI accessible to the UE, the NEF searches for a locally stored DNAI, where the locally stored DNAI is also the DNAI included in the notification message, transmits the found DNAI to the service scheduling server as a DNAI accessible to the UE, and the service scheduling server can obtain a corresponding request result. The request result includes a DNAI accessible to the UE, or may not include DNAI information, which can be determined according to an actual situation.

In another exemplary embodiment, after step S210, the method further includes: receiving a confirmation message transmitted by the service server currently accessed by the user equipment, where the confirmation message is initiated after the service server currently accessed by the user equipment transmits an IP address of the service scheduling server to the user equipment in response to the notification message; and transmitting, in response to the confirmation message, the trigger message to the service scheduling server.

The trigger message transmitted by the NEF to the service scheduling server is also a notification message. For example, after receiving the notification message transmitted by the SMF to indicate that the user plane path of the UE may be changed, the NEF saves the notification message, to transmit the notification message to the service scheduling server after receiving a confirmation message transmitted by the service server currently accessed by the user equipment, thereby triggering the service scheduling server to reschedule the service server for the UE.

It can be seen from the above that with the method proposed in this embodiment, when the service server may be switched, the UE can learn the IP address of the service server that may be switched to access, and in response to a determination that the core network also correspondingly changes the user plane path of the UE corresponding to the switching of the service server, the UE can successfully switch to access the service server rescheduled by the service scheduling server. Therefore, the service access in the UE will not be interrupted, thereby realizing the service continuity when the service server is switched.

FIG. 7 is a flowchart of a switching control method for a service server according to another exemplary embodiment of the present disclosure. The method may be executed by the SMF in the 5G core network, or in some embodiments, the method may be executed by a function entity with the same network function as the SMF included in other types of mobile networks, which is not limited in this embodiment. In this embodiment, the SMF is used as an exemplary execution entity to describe the method of this embodiment.

The service server mentioned in this embodiment still refers to a service server that provides a service data service for the UE. For example, it may be an edge service server or a center server shown in the implementation environment in FIG. 2, or other forms of service servers. A service server accessed by the UE before the service server is switched should be a service server deployed in a network closer to the UE, such as an edge service server deployed in an edge network.

In this embodiment, the SMF is used as an exemplary execution entity to describe the method of this embodiment.

As shown in FIG. 7, the method may include S310 to S350. A detailed description is as follows:

S310: Transmit a notification message to a service server currently accessed by user equipment, the notification message being used for indicating that a user plane path of the user equipment may be changed.

As described above, the SMF can monitor the location information of the UE, and generate the notification message when determining, according to the monitored location information, that the service server accessed by the UE may be switched. For example, if the SMF determines that the UE moves out of a range covered by a data network of the currently accessed service server, it determines that the service server accessed by the UE may be switched.

The SMF can also monitor the deployment of an edge network according to DNAI information corresponding to the edge network, to further determine whether it is desirable to switch the service server accessed by the UE after the UE moves. For example, the SMF can determine that there is a more suitable edge network and edge service server at an updated access location of the UE according to the DNAI information, to determine that the service server accessed by the UE may be switched.

The notification message includes an instruction for changing a user plane path of the UE, so the notification message can be used to indicate that the user plane path of the user equipment may be changed. The notification message further includes an IP address of the UE. The notification message may further include a DNAI, and the DNAI included in the notification message is used for identifying a data network accessible to the UE.

In this embodiment, the SMF transmits the notification message to the service server currently accessed by the UE, to trigger the service server currently accessed by the UE to transmit the IP address of the service scheduling server to the UE. The UE transmits a service scheduling request to the service scheduling server according to the received IP address of the service scheduling server, to request the service scheduling server to schedule a new service server to provide service services for the UE. The SMF can transmit the notification message to the service scheduling server through the NEF and the AF.

S330: Receive an impact routing request transmitted by a service scheduling server, the impact routing request being initiated after the service scheduling server reschedules a service server for the user equipment according to a received trigger message.

After rescheduling the service server for the UE according to the service scheduling request transmitted by the UE, the service scheduling server transmits the impact routing request to the core network accessed by the UE, so the SMF in the core network can receive the impact routing request. For example, the service scheduling server may transmit the impact routing request to the SMF through the NEF.

S350: Change, in response to the impact routing request, the user plane path of the user equipment in a core network accessed by the user equipment according to the rescheduled service server.

After receiving the impact routing request, the SMF triggers and executes the change of the user plane path of the UE, for example, performs the switching of the UPF, and the switched UPF is a UPF corresponding to the rescheduled service server.

For example, the UPF in the core network can be deployed in a form that supports packet routing and forwarding, that is, an I-UPF and a plurality of local anchor UPFs are deployed in the core network, and the user plane path of change process the UE involves the switching of the local anchor UPFs. If the impact routing request includes a DNAI of the rescheduled service server, an IP address of the service server (that is, the rescheduled service server) corresponding to the DNAI further may be configured in the I-UPF, to use this IP address as an offload address of the I-UPF after the user plane path is switched.

In addition, the I-UPF may be switched at the same time in the process of changing the user plane path of the UE. If the I-UPF is switched at the same time, the IP address of the rescheduled service server is configured on a new I-UPF as an offload address.

According to the content recorded in the embodiments, if the service scheduling server reschedules the center service server for the UE, the impact routing request carries an offload message corresponding to the user plane path change.

The offload message corresponding to the user plane path change indicates that it is not necessary for the network to establish an offload path for the UE, and the SMF does not need to establish an offload path when changing the user plane path of the UE, nor does it need to issue an offload address. That is, if the service scheduling server schedules the center service server to provide service services for the UE, the SMF changes the user plane path of the UE to a path for the UE to access the center service server. In the process of changing the user plane path, there is no need to establish an offload path.

It can be seen from the above that in this embodiment, when the service server may be switched, since the UE already learns the IP address of the service server that may be switched to access, the SMF also correspondingly changes the user plane path of the UE for the switching of the service server. Therefore, the UE can successfully switch to access the service server rescheduled by the service scheduling server, and the service access in the UE will not be interrupted, thereby ensuring the service continuity.

Figure 8:
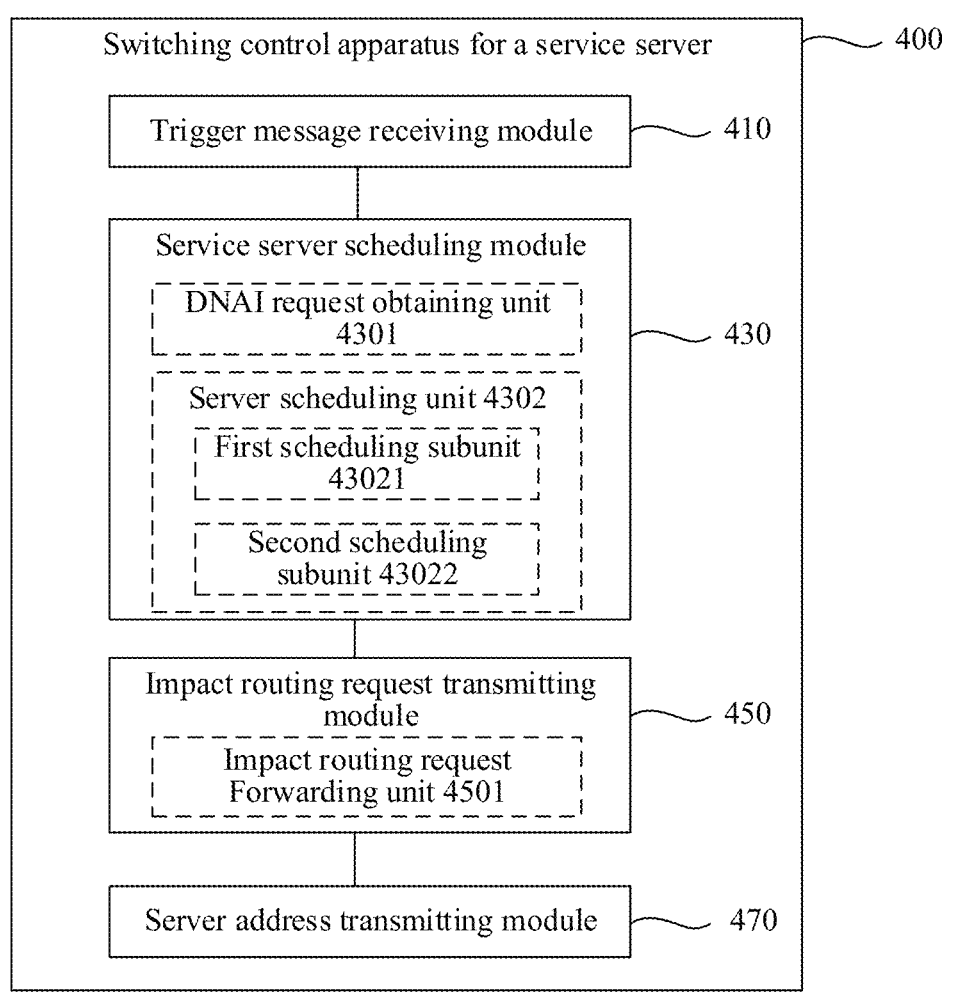
FIG. 8 is a schematic block diagram of a switching control apparatus for a service server according to certain embodiment(s) of the present disclosure.

FIG. 8 is a block diagram of a switching control apparatus for a service server according to an exemplary embodiment of the present disclosure. As shown in FIG. 8, the apparatus 400 includes: a trigger message receiving module 410, configured to receive a trigger message for triggering a service scheduling server to reschedule a service server for user equipment; a service server scheduling module 430, configured to reschedule the service server for the user equipment in response to the trigger message; an impact routing request transmitting module 450, configured to transmit an impact routing request to a core network accessed by the user equipment, the impact routing request being used for triggering the core network to change a user plane path of the user equipment; and an server address transmitting module 470, configured to transmit an Internet Protocol (IP) address of the rescheduled service server to the user equipment, to trigger the user equipment to switch a currently accessed service server to the rescheduled service server.

In another exemplary embodiment, the trigger message includes a service scheduling request transmitted by the user equipment; and the service server scheduling module 430 includes: a DNAI request obtaining unit 4301, configured to request the core network to obtain a data network access identifier accessible to the user equipment in response to the service scheduling request; and a server scheduling unit 4302, configured to reschedule the service server for the user equipment according to a request result returned by the core network.

In another exemplary embodiment, the server scheduling unit 4302 includes: a first scheduling subunit 43021, configured to select, in response to a determination that the request result returned by the core network includes data network access identifiers, a target data network access identifier from the data network access identifier, and use a service server corresponding to the target data network access identifier as the rescheduled service server; and a second scheduling subunit 43022, configured to select a service server deployed in a center network as the rescheduled service server in response to a determination that the request result does not include a data network access identifier, where the service server currently accessed by the user equipment is deployed in an edge network, and the center network corresponds to the edge network.

In another exemplary embodiment, the service scheduling request is initiated by the user equipment according to an IP address of the service scheduling server, after receiving a notification message from the core network, the service server currently accessed by the user equipment transmits the IP address of the service scheduling server to the user equipment, and the notification message is used for indicating that the user plane path of the user equipment may be changed.

In another exemplary embodiment, the core network transmits the notification message to the service server currently accessed by the user equipment through a first application function entity; and the impact routing request transmitting module 450 includes: an impact routing request forwarding unit 4501, configured to transmit the impact routing request to a second application function entity, to forward the impact routing request to the core network through the second application function entity.

In another exemplary embodiment, if the rescheduled service server is determined as a service server deployed in a center network, the impact routing request carries an offload message corresponding to a user plane path change, and the offload message indicates that no offload path is established for the user equipment.

Figure 9:
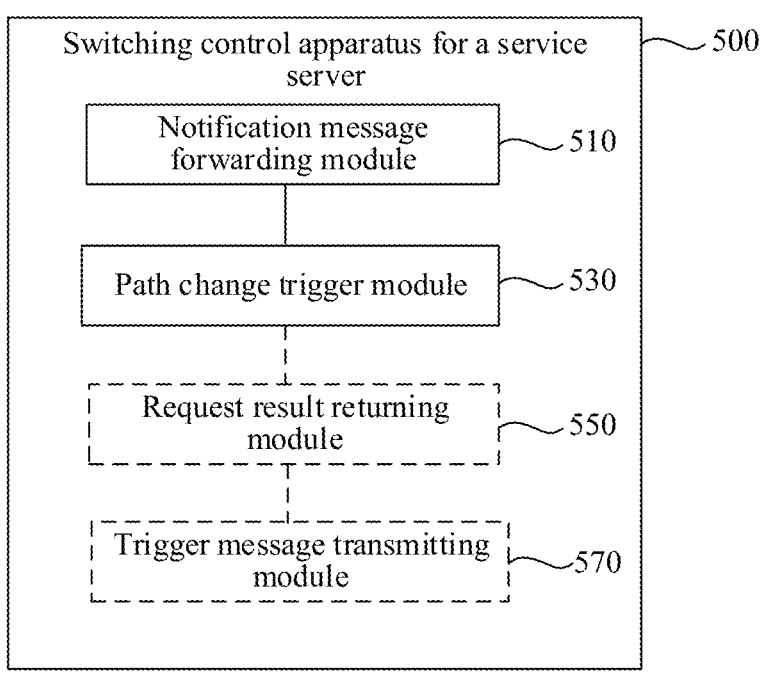
FIG. 9 is a schematic block diagram of a switching control apparatus for a service server according to certain embodiment(s) of the present disclosure.

FIG. 9 is a block diagram of a switching control apparatus for a service server according to another exemplary embodiment of the present disclosure. As shown in FIG. 9, the apparatus 500 includes: a notification message forwarding module 510, configured to transmit a notification message to a service server currently accessed by user equipment, the notification message being used for indicating that a user plane path of the user equipment may be changed; and a path change trigger module 530, configured to receive an impact routing request transmitted by a service scheduling server, and change, in response to the impact routing request, the user plane path of the user equipment in a core network accessed by the user equipment, the impact routing request being initiated after the service scheduling server reschedules a service server for the user equipment in response to a trigger message.

In another exemplary embodiment, the apparatus 500 further includes: a request result returning module 550, configured to transmit a data network access identifier accessible to the user equipment to the service scheduling server after the service scheduling server receives a service scheduling request transmitted by the user equipment.

In another exemplary embodiment, the apparatus 500 further includes: a trigger message transmitting module 570, configured to receive a confirmation message transmitted by the service server currently accessed by the user equipment, where the confirmation message is initiated after the service server currently accessed by the user equipment transmits an Internet Protocol (IP) address of the service scheduling server to the user equipment in response to the notification message; and transmit, in response to the confirmation message, the trigger message to the service scheduling server.

Figure 10:
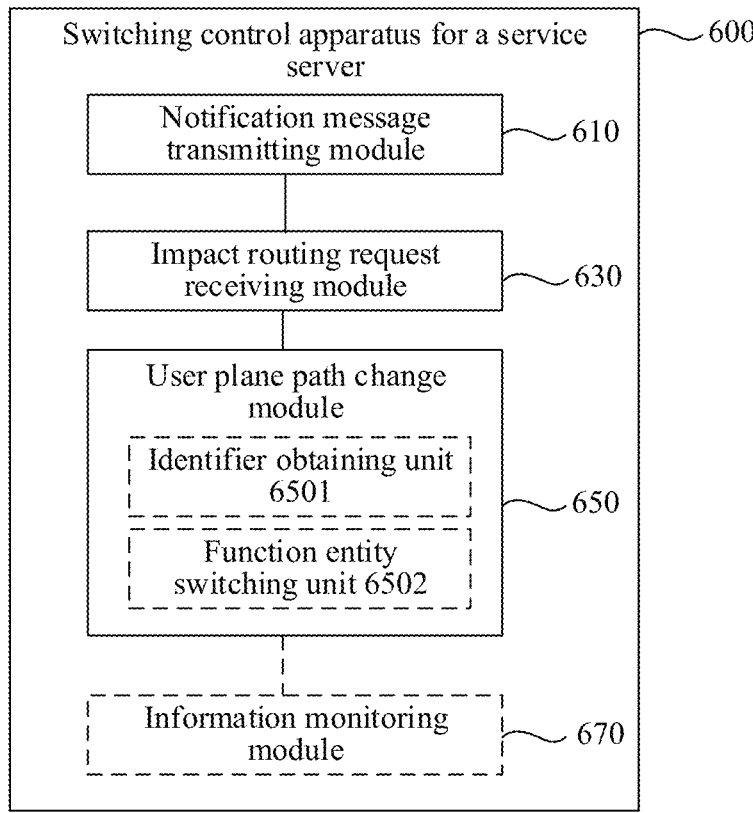
FIG. 10 is a schematic block diagram of a switching control apparatus for a service server according to certain embodiment(s) of the present disclosure.

FIG. 10 is a block diagram of a switching control apparatus for a service server according to another exemplary embodiment of the present disclosure. As shown in FIG. 10, the apparatus 600 includes: a notification message transmitting module 610, configured to transmit a notification message to a service server currently accessed by user equipment, the notification message being used for indicating that a user plane path of the user equipment may be changed; an impact routing request receiving module 630, configured to receive an impact routing request transmitted by a service scheduling server, the impact routing request being initiated after the service scheduling server reschedules a service server for the user equipment according to a received trigger message; and a user plane path change module 650, configured to change, in response to the impact routing request, the user plane path of the user equipment in a core network accessed by the user equipment according to the rescheduled service server.

In another exemplary embodiment, the user plane path change module 650 includes: an identifier obtaining unit 6501, configured to obtain a target data network access identifier included in the impact routing request, where the target data network access identifier corresponds to the rescheduled service server; and a function entity switching unit 6502, configured to switch a local anchor user plane function entity of the user equipment to a local anchor user plane function entity corresponding to the target data network access identifier in the core network, configure an Internet Protocol (IP) address of the rescheduled service server in an intermediate user plane function entity, and use the IP address of the rescheduled service server as an offload address of the intermediate user plane function entity after the user plane path is switched.

In another exemplary embodiment, the apparatus 600 further includes:

an information monitoring module 670, configured to monitor location information of the user equipment, and generate the notification message when determining, according to the monitored location information, that the user plane path of the user equipment may be switched.

The apparatus provided in the embodiment and the method provided in the preceding embodiment are based on the same concept. The specific manners of performing operations by each module and unit of the apparatus have been described in detail in the method embodiment, and are omitted here.

The embodiments of the present disclosure further provide an electronic device, including a processor and a memory, and the memory stores computer-readable instructions, the computer-readable instructions, when executed by the processor, implementing the switching control method for a service server as described above.

Figure 11:
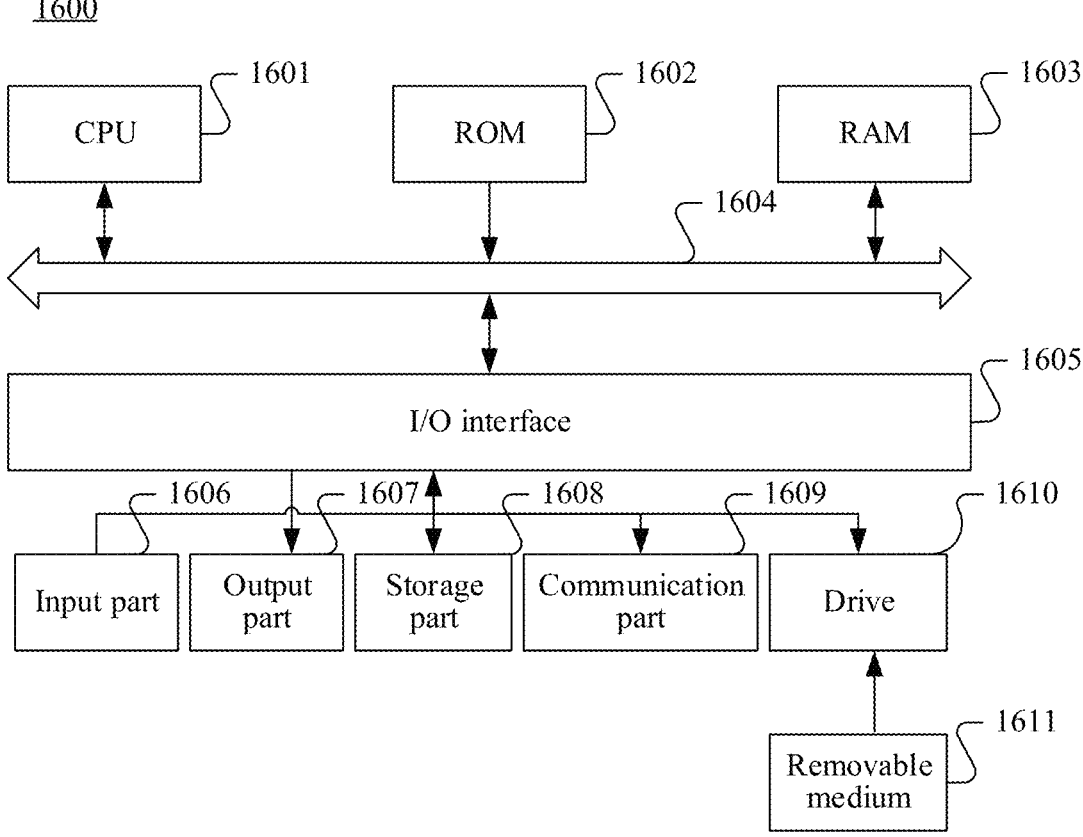
FIG. 11 is a schematic structural diagram of an electronic device according to certain embodiment(s) of the present disclosure.

FIG. 11 is a schematic structural diagram of an electronic device adapted to implement the embodiments of the present disclosure.

The electronic device 1600 shown in FIG. 11 is merely an example, and should not impose any limitation on a function and use scope of the embodiments of the present disclosure.

As shown in FIG. 11, the electronic device 1600 includes a central processing unit (CPU) 1601, which can execute various appropriate actions and processing according to a program stored in a read-only memory (ROM) 1602 or a program loaded from a storage part 1608 to a random access memory (RAM) 1603, such as performing the methods described in the embodiments. The RAM 1603 further stores various programs and data desired for operating the system. The CPU 1601, the ROM 1602, and the RAM 1603 are connected to each other through a bus 1604. An input/output (I/O) interface 1605 is also connected to the bus 1604.

The following components are connected to the I/O interface 1605: an input part 1606 including a keyboard and a mouse, or the like; an output part 1607 including a cathode ray tube (CRT), a liquid crystal display (LCD), a speaker, or the like; a storage part 1608 including hard disk, or the like; and a communication part 1609 including a network interface card such as a local area network (LAN) card, a modem, or the like. The communication part 1609 performs communication processing by using a network such as the Internet. A drive 1610 is also connected to the I/O interface 1605 as desired. A removable medium 1611, such as a magnetic disk, an optical disc, a magneto-optical disk, or a semiconductor memory, is installed on the drive 1610 as desired, so that a computer program read from the removable medium is installed into the storage part 1608 as desired.

Particularly, according to an embodiment of the present disclosure, the processes described above by referring to the flowcharts may be implemented as computer software programs. For example, an embodiment of the present disclosure includes a computer program product. The computer program product includes a computer program stored in a computer-readable medium. The computer program includes a computer program used for performing a method shown in the flowchart. In such an embodiment, the computer program may be downloaded and installed through the communication part 1609 from a network, and/or installed from the removable medium 1611. When the computer program is executed by the CPU 1601, the various functions defined in the system of the present disclosure are executed.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The computer-readable medium shown in the embodiments of the present disclosure may be a computer-readable signal medium or a computer-readable storage medium or any combination of two. More specific examples of the computer readable storage medium may include, but are not limited to: An electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, a computer-readable signal medium may include a data signal in a baseband or propagated as a part of a carrier wave, the data signal carrying a computer-readable computer program. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable storage medium may be transmitted using any suitable medium, including but not limited to: a wireless medium, a wire medium, or the like, or any suitable combination thereof.

The flowcharts and block diagrams in the accompanying drawings illustrate possible system architectures, functions, and operations that may be implemented by a system, a method, and a computer program product according to various embodiments of the present disclosure. Each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed in parallel, and sometimes the two boxes may be performed in a reverse sequence. This is determined by a related function. Each box in the block diagram or the flowchart, and a combination of blocks in the block diagram or the flowchart may be implemented by using a dedicated hardware-based system that performs a specified function or operation, or may be implemented by using a combination of dedicated hardware and computer instructions.

Related units described in the embodiments of the present disclosure may be implemented in a software manner, or may be implemented in a hardware manner, and the unit described can also be set in a processor. Names of the units do not constitute a limitation on the units.

According to another aspect of the present disclosure, a computer-readable storage medium is further provided, on which a computer program is stored. The computer program, when executed by a processor, implements the switching control method for a service server as described above. The computer-readable medium may be included in the electronic device described in the embodiments, or may exist alone and is not disposed in the electronic device.

According to another aspect of the present disclosure, a computer program product or a computer program is further provided, including computer instructions, the computer instructions being stored in a computer-readable storage medium. A processor of a computing device reads the computer instructions from the computer-readable storage medium, and executes the computer instructions, so that the computing device performs the switching control method for a service server provided in the embodiments.

What is described above is merely exemplary embodiments of the present disclosure, and is not intended to limit the embodiments of the present disclosure. The protection scope of the present disclosure is subject to the protection scope specified in the claims.

What is claimed is:

1. A switching control method, performed by a service scheduling server, the method comprising:
   receiving, from a network exposure function (NEF) through a second application function (AF), a trigger message for triggering the service scheduling server to reschedule a service server for a user equipment, wherein the user equipment accesses a first edge service server and obtains an Internet Protocol (IP) address of the service scheduling server from the first edge service server, and the trigger message is transmitted by the NEF in response to receiving a confirmation message from the first edge service server through a first AF;
   rescheduling, in response to the trigger message, a second edge service server for the user equipment;
   transmitting an impact routing request to the NEF through the second AF, the impact routing request being further transmitted by the NEF to a session management function (SMF), wherein the SMF triggers to change a user plane path of the user equipment in a core network accessed by the user equipment; and
   transmitting, in response to a service scheduling request by the user equipment, an IP address of the second edge service server to the user equipment, to trigger the user equipment to switch from the first edge service server to the second edge service server.

2. The method according to claim 1, wherein the trigger message includes a service scheduling request transmitted by the user equipment; and rescheduling the second edge service server comprises:

requesting, in response to the service scheduling request, the core network to obtain a data network access identifier accessible to the user equipment; and rescheduling, according to a request result returned by the core network, the second edge service server for the user equipment.

3. The method according to claim 2, wherein rescheduling the second edge service server comprises:

selecting, in response to a determination that the request result returned by the core network comprises a plurality of data network access identifiers, a target data network access identifier from the plurality of data network access identifiers, and using a service server corresponding to the target data network access identifier as the rescheduled second edge service server; and selecting a service server deployed in a center network as the rescheduled second edge service server in response to a determination that the request result does not comprise a data network access identifier, wherein the first edge service server currently accessed by the user equipment is deployed in an edge network, and the center network corresponds to the edge network.

4. The method according to claim 2, wherein the service scheduling request is initiated by the user equipment according to an IP address of the service scheduling server, the first edge service server currently accessed by the user equipment transmits the IP address of the service scheduling server to the user equipment, and the notification message indicates that the user plane path of the user equipment is to be changed.

5. The method according to claim 4, wherein the core network transmits the notification message to the first edge service server currently accessed by the user equipment through a first application function entity; and transmitting the impact routing request comprises:

transmitting the impact routing request to a second application function entity, to forward the impact routing request to the core network through the second application function entity.

6. The method according to claim 2, wherein the impact routing request carries an offload message corresponding to a user plane path change, and the offload message indicates that no offload path is established for the user equipment.

7. The method according to claim 1, wherein rescheduling, in response to the trigger message, the second edge service server for the user equipment comprises:

in response to the trigger message transmitted by the NEF including a data network access identifier (DNAI) accessible to the user equipment, rescheduling the second edge service server for the user equipment based on the DNAI; and in response to the trigger message transmitted by the NEF not including the DNAI or no edge service server in the DNAI is selected by the service scheduling server, dispatching a center service server as the rescheduled second edge service server for the user equipment.

8. The method according to claim 2, wherein:

requesting the core network to obtain the data network access identifier accessible to the user equipment comprises: requesting the NEF to obtain the data network access identifier accessible to the user equipment; and the request result is returned by the NEF.

9. A switching control apparatus in a service scheduling server, comprising: a memory storing computer program instructions; and a processor coupled to the memory and configured to execute the computer program instructions and perform:

receiving, from a network exposure function (NEF) through a second application function (AF), a trigger message for triggering the service scheduling server to reschedule a service server for a user equipment, wherein the user equipment accesses a first edge service server and obtains an Internet Protocol (IP) address of the service scheduling server from the first edge service server, and the trigger message is transmitted by the NEF in response to receiving a confirmation message from the first edge service server through a first AF;

rescheduling, in response to the trigger message, a second edge service server for the user equipment;

transmitting an impact routing request to the NEF through the second AF, the impact routing request being further transmitted by the NEF to a session management function (SMF), wherein the SMF triggers to change a user plane path of the user equipment in a core network accessed by the user equipment; and transmitting, in response to a service scheduling request by the user equipment, an IP address of the second edge service server to the user equipment, to trigger the user equipment to switch from the first edge service server to the second edge service server.

10. The apparatus according to claim 9, wherein the trigger message includes a service scheduling request transmitted by the user equipment; and rescheduling the second edge service server includes:

requesting, in response to the service scheduling request, the core network to obtain a data network access identifier accessible to the user equipment; and rescheduling, according to a request result returned by the core network, the second edge service server for the user equipment.

11. The apparatus according to claim 10, wherein rescheduling the second edge service server includes:

selecting, in response to a determination that the request result returned by the core network comprises a plurality of data network access identifiers, a target data network access identifier from the plurality of data network access identifiers, and using a service server corresponding to the target data network access identifier as the rescheduled second edge service server; and selecting a service server deployed in a center network as the rescheduled second edge service server in response to a determination that the request result does not comprise a data network access identifier, wherein the first edge service server currently accessed by the user equipment is deployed in an edge network, and the center network corresponds to the edge network.

12. The apparatus according to claim 10, wherein the service scheduling request is initiated by the user equipment according to an IP address of the service scheduling server, the first edge service server currently accessed by the user equipment transmits the IP address of the service scheduling server to the user equipment, and the notification message indicates that the user plane path of the user equipment is to be changed.

13. The apparatus according to claim 12, wherein the core network transmits the notification message to the first edge service server currently accessed by the user equipment through a first application function entity; and transmitting the impact routing request includes:

transmitting the impact routing request to a second application function entity, to forward the impact routing request to the core network through the second application function entity.

14. The apparatus according to claim 10, wherein the impact routing request carries an offload message corresponding to a user plane path change, and the offload message indicates that no offload path is established for the user equipment.

15. A non-transitory computer-readable storage medium storing computer program instructions executable by at least one processor of a service scheduling server to perform:

receiving, from a network exposure function (NEF) through a second application function (AF), a trigger message for triggering the service scheduling server to reschedule a service server for a user equipment, wherein the user equipment accesses a first edge service server and obtains an Internet Protocol (IP) address of the service scheduling server from the first edge service server, and the trigger message is transmitted by the NEF in response to receiving a confirmation message from the first edge service server through a first AF;

rescheduling, in response to the trigger message, a second edge service server for the user equipment;

transmitting an impact routing request to the NEF through the second AF, the impact routing request being further transmitted by the NEF to a session management function (SMF), wherein the SMF triggers to change a user plane path of the user equipment in a core network accessed by the user equipment; and transmitting, in response to a service scheduling request by the user equipment, an IP address of the second edge service server to the user equipment, to trigger the user equipment to switch from the first edge service server to the second edge service server.

16. The non-transitory computer-readable storage medium according to claim 15, wherein the trigger message includes a service scheduling request transmitted by the user equipment; and rescheduling the second edge service server includes:

requesting, in response to the service scheduling request, the core network to obtain a data network access identifier accessible to the user equipment; and rescheduling, according to a request result returned by the core network, the second edge service server for the user equipment.

17. The non-transitory computer-readable storage medium according to claim 16, wherein rescheduling the second edge service server includes:

selecting, in response to a determination that the request result returned by the core network comprises a plurality of data network access identifiers, a target data network access identifier from the plurality of data network access identifiers, and using a service server corresponding to the target data network access identifier as the rescheduled second edge service server; and selecting a service server deployed in a center network as the rescheduled second edge service server in response to a determination that the request result does not comprise a data network access identifier, wherein the first edge service server currently accessed by the user equipment is deployed in an edge network, and the center network corresponds to the edge network.

18. The non-transitory computer-readable storage medium according to claim 16, wherein the service scheduling request is initiated by the user equipment according to an IP address of the service scheduling server, the first edge service server currently accessed by the user equipment transmits the IP address of the service scheduling server to the user equipment, and the notification message indicates that the user plane path of the user equipment is to be changed.

19. The non-transitory computer-readable storage medium according to claim 18, wherein the core network transmits the notification message to the first edge service server currently accessed by the user equipment through a first application function entity; and transmitting the impact routing request includes:

transmitting the impact routing request to a second application function entity, to forward the impact routing request to the core network through the second application function entity.

20. The non-transitory computer-readable storage medium according to claim 16, wherein the impact routing request carries an offload message corresponding to a user plane path change, and the offload message indicates that no offload path is established for the user equipment.

* * * * *